(12) United States Patent
Taniguchi et al.

(10) Patent No.: US 9,883,071 B2
(45) Date of Patent: Jan. 30, 2018

(54) IMAGE PROCESSING APPARATUS, TERMINAL DEVICE, AND NON-TRANSITORY DATA RECORDING MEDIUM RECORDING CONTROL PROGRAM

(71) Applicant: Konica Minolta, Inc., Chiyoda-ku, Tokyo (JP)

(72) Inventors: Yosuke Taniguchi, Osaka (JP); Junichi Hase, Osaka (JP); Nobuhiro Mishima, Osaka (JP); Hidetaka Iwai, Itami (JP); Toshikazu Kawaguchi, Kobe (JP); Hideaki Soejima, Amagasaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 5 days.

(21) Appl. No.: 14/922,661

(22) Filed: Oct. 26, 2015

(65) Prior Publication Data

US 2016/0119500 A1    Apr. 28, 2016

(30) Foreign Application Priority Data

Oct. 28, 2014   (JP) .................................. 2014-219277

(51) Int. Cl.
*H04N 1/40* (2006.01)
*G06F 3/12* (2006.01)
(Continued)

(52) U.S. Cl.
CPC ......... *H04N 1/32267* (2013.01); *G06F 17/20* (2013.01); *G06F 17/2211* (2013.01); *G06F 17/2229* (2013.01); *G06F 17/2288* (2013.01); *G06F 17/241* (2013.01); *G06F 21/608* (2013.01); *H04N 1/0083* (2013.01); *H04N 1/0087* (2013.01); *H04N 1/00129* (2013.01); *H04N 1/00244* (2013.01); *H04N 1/00251* (2013.01); *H04N 1/00405* (2013.01); *G02B 2027/014* (2013.01); *G02B 2027/0138* (2013.01); *H04N 2201/0094* (2013.01);
(Continued)

(58) Field of Classification Search
None
See application file for complete search history.

(56) References Cited

U.S. PATENT DOCUMENTS 5,838,458 A *  11/1998  Tsai ................... H04N 1/00355
                                                    358/402
6,374,354 B1 *  4/2002  Walmsley .................. B41J 2/14
                                                    348/E5.024
(Continued)

FOREIGN PATENT DOCUMENTS

| JP | 2004336288 A | 11/2004 |
| JP | 2014056556 A | 3/2014 |
| JP | 2015095704 A | 5/2015 |

*Primary Examiner* — Madelein Nguyen
(74) *Attorney, Agent, or Firm* — Cantor Colburn LLP

(57) ABSTRACT

A processor of an MFP generates a first additional image based on an image in a designated region of a document. Furthermore, the processor of the MFP generates a second additional image showing a difference between the document and a document before revision of the document. Then, the processor of the MFP registers the first additional image and the second additional image on a server in association with a marker image showing the revised edition number of the document.

14 Claims, 18 Drawing Sheets

(51) Int. Cl.
  *H04N 1/60* (2006.01)
  *H04N 1/32* (2006.01)
  *H04N 1/00* (2006.01)
  *G06F 17/20* (2006.01)
  *G06F 17/22* (2006.01)
  *G06F 17/24* (2006.01)
  *G06F 21/60* (2013.01)
  *G02B 27/01* (2006.01)

(52) U.S. Cl.
  CPC ............... *H04N 2201/327* (2013.01); *H04N 2201/3245* (2013.01)

(56) References Cited

U.S. PATENT DOCUMENTS

| | | | | |
|---|---|---|---|---|
| 2002/0006212 | A1* | 1/2002 | Rhoads | G06K 9/00442 382/100 |
| 2002/0016718 | A1* | 2/2002 | Rothschild | G06F 19/321 705/2 |
| 2002/0051200 | A1* | 5/2002 | Chang | H04L 12/2805 358/1.15 |
| 2004/0046997 | A1* | 3/2004 | Tsai | H04L 63/083 358/1.15 |
| 2006/0126096 | A1* | 6/2006 | Yasukaga | G06F 17/243 358/1.14 |
| 2006/0171002 | A1* | 8/2006 | Mori | H04N 1/3873 358/538 |
| 2006/0277219 | A1* | 12/2006 | Sato | G06F 17/30616 |
| 2007/0183000 | A1* | 8/2007 | Eisen | H04N 1/00864 358/452 |
| 2009/0086232 | A1* | 4/2009 | Ohira | H04N 1/00204 358/1.9 |
| 2010/0088521 | A1* | 4/2010 | Koplow | G06F 21/645 713/178 |
| 2010/0277764 | A1* | 11/2010 | Yamazaki | G03G 15/5066 358/1.15 |
| 2011/0029443 | A1* | 2/2011 | King | G06K 9/228 705/310 |
| 2011/0261186 | A1* | 10/2011 | Blackburn | H04N 1/2187 348/92 |
| 2012/0020532 | A1* | 1/2012 | Snow | G06K 9/036 382/112 |
| 2012/0033265 | A1* | 2/2012 | Sakaue | G07D 7/20 358/3.28 |
| 2012/0229857 | A1* | 9/2012 | Pinkerton | G06T 11/60 358/1.18 |
| 2013/0031213 | A1* | 1/2013 | Nissennboim | H04L 63/20 709/219 |
| 2013/0133085 | A1* | 5/2013 | Tsujimoto | G06F 21/6245 726/28 |
| 2013/0198521 | A1* | 8/2013 | Wu | G06F 21/6209 713/175 |
| 2014/0002835 | A1* | 1/2014 | Li | H04N 1/00381 358/1.13 |
| 2014/0019756 | A1* | 1/2014 | Krajec | H04L 63/0428 713/167 |
| 2014/0164285 | A1* | 6/2014 | Ashburn | G06Q 40/06 705/36 R |
| 2015/0310174 | A1* | 10/2015 | Coudert | G06F 19/322 705/3 |
| 2016/0041822 | A1* | 2/2016 | Mooney | G06F 8/423 717/122 |

* cited by examiner

FIG.6
| REVISED EDITION NUMBER | MARKER IMAGE | FIRST ADDITIONAL IMAGE | USER HAVING BROWSING RIGHT | SECOND ADDITIONAL IMAGE | DISPLAY POSITION |
|---|---|---|---|---|---|
| ver1 |  | 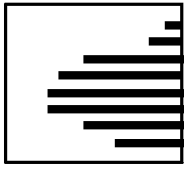 | A<br>B<br>C | | |

FIG.10

| REVISED EDITION NUMBER | MARKER IMAGE | FIRST ADDITIONAL IMAGE | USER HAVING BROWSING RIGHT | SECOND ADDITIONAL IMAGE | DISPLAY POSITION |
|---|---|---|---|---|---|
| ver1 | | | A B C | | |
| ver2 | | | A B C | CCCC | (100,100) |
| ver3 | | | A B C | DDDDDDD | (100, 80) |
| ver4 | | | A B C | | (100, 60) |

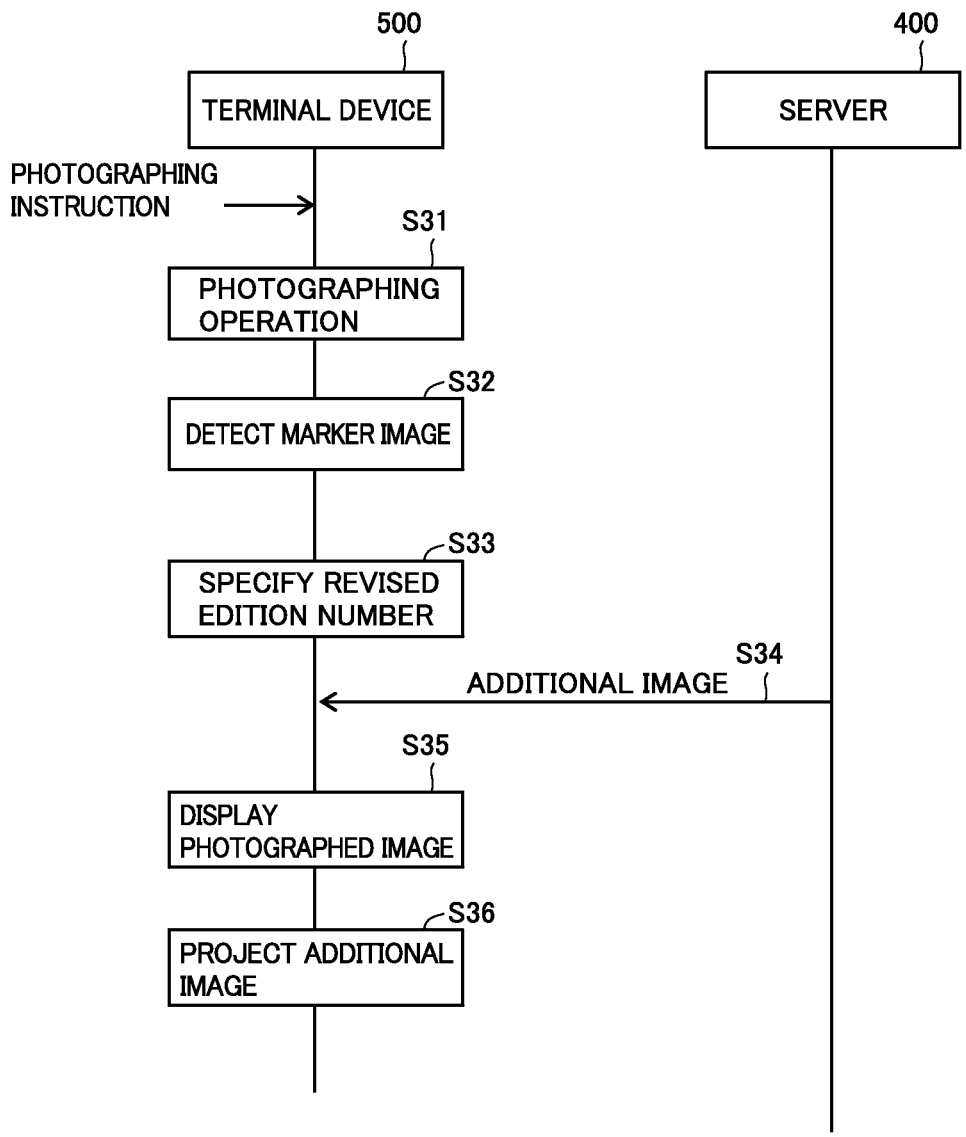

IMAGE PROCESSING APPARATUS, TERMINAL DEVICE, AND NON-TRANSITORY DATA RECORDING MEDIUM RECORDING CONTROL PROGRAM

CROSS REFERENCE TO RELATED APPLICATIONS

The present invention claims priority under 35 U.S.C. § 119 to Japanese Application No. 2014-219277, filed Oct. 28, 2014, the entire content of which is incorporated herein by reference.

BACKGROUND OF THE INVENTION

Field of the Invention

The present disclosure relates to an image processing apparatus, a terminal device, and a non-transitory recording medium recording a control program, and particularly to an image processing apparatus, a terminal device, and a non-transitory data recording medium recording a control program, which utilize an augmented reality technique.

Description of the Related Art

In the case where confidential information is included in a document, the confidential information may not be printed on the document in terms of security. In this case, the document may include a specific mark in place of the above-described confidential information. A user uses a display device such as a wearable display for viewing the document. Specifically, the user uses a photographing device mounted in the display device to take a photograph of the document and display the photographed image. In this case, the display device further adds, at the position of the above-described mark in this photographed image, a virtual image associated with the mark, referred also to as an air tag or the like and showing the above-described confidential information. In other words, by applying the above-described display device to this document, the user can view the document including confidential information.

SUMMARY OF THE INVENTION

In addition, a document may be updated. However, in the case where the user obtains the document before update, this user cannot know the contents of the latest document based on this document before update.

One of objects of the present disclosure is to provide an image processing apparatus by which the latest contents of a document can be presented to a user based on the document that is a printed matter. Furthermore, one of the objects of the present disclosure is to provide a terminal device by which the latest contents of a document can be presented to a user based on the document that is a printed matter. Furthermore, one of the objects of the present disclosure is to provide a processing method by which the latest contents of a document can be presented to a user based on the document that is a printed matter. Furthermore, one of the objects of the present disclosure is to provide a control program by which the latest contents of a document can be presented to a user based on the document that is a printed matter.

According to one embodiment, an image processing apparatus capable of managing a document is provided. This image processing apparatus includes: a memory for storing an instruction; and a processor for executing the instruction. The processor is configured to generate a first additional image based on an image in a designated region of the document, generate a second additional image showing a difference between the document and a document before revision of the document, and register the first additional image and the second additional image on another device in association with a marker image showing a revision stage of the document.

Preferably, generating the second additional image includes extracting the difference between the document and the document before revision.

Preferably, the processor is further configured to synthesize an image showing the difference with the first additional image when an area of the difference is included in the designated region of the document.

Preferably, the processor is further configured to print the marker image to replace an image in the designated region of the document with the printed marker image.

Preferably, the processor is further configured to set information for the second additional image for each user, the information showing whether browsing is allowed or not when the document is displayed.

According to another embodiment, a terminal device includes a photographing device, a memory for storing an instruction, and a processor for executing the instruction. The processor is configured to obtain, from another device, an additional image registered in association with a marker image in a photographed image taken by the photographing device, and cause a display device to display the photographed image to which the additional image is added. The additional image includes a first additional image showing an image in a designated region in a document, and a second additional image showing a difference between the document and a document before revision. The processor is further configured to add the first additional image at a position of the marker image in the document in the photographed image and add the second additional image at an area of the difference from the document before revision.

Preferably, another device stores an additional image in association with a marker image showing a revision stage for each revised edition of the document. The processor is configured to specify the revision stage of the document based on the marker image in the photographed image, and extract the second additional image from additional images registered on another device, the second additional image being associated with each of marker images from the revision stage of the document to a latest revised edition thereof.

According to another embodiment, a method of processing a document includes the steps of: generating a first additional image to be added to a designated region of a document based on an image in the designated region; registering the first additional image and a second additional image showing a difference between the document and a document before revision of the document in association with a marker image showing a revision stage of the document; photographing, by a photographing device mounted in a terminal device, a document printed while replacing the image in the designated region with the first additional image; specifying the revision stage of the document based on the marker image in the photographed image obtained by the photographing device; obtaining the first additional image from additional images registered on the server, the first additional image being registered in association with the marker image; obtaining the second additional image from the additional images registered on the server, the second additional image being associated with each of the marker images from the revision stage of the document to the latest revised edition thereof; and, by the terminal device, adding the first additional image at a position of the marker image in the document in the photographed image, and adding the second additional image at an area of a difference from the document of the latest revised edition.

According to another embodiment, a non-transitory recording medium recording a control program for controlling an operation of an image processing apparatus is provided. The control program causes the image processing apparatus to generate a first additional image based on an image in a designated region of a document, generate a second additional image showing a difference between the document and a document before revision of the document; and register the first additional image and the second additional image on another device in association with a marker image showing a revision stage of the document.

According to another embodiment, a non-transitory recording medium recording a control program for controlling an operation of a terminal device equipped with a photographing device and an addition device is provided. The control program causes the terminal device to photograph a document using the photographing device, obtain, from another device, an additional image registered in association with a marker image in a photographed image taken by the photographing device, and display the photographed image to which the additional image is added. Another device stores a first additional image showing an image in a designated region in the document and a second additional image showing a difference between the document and a document before revision of the document in association with the marker image showing a revision stage for each revised edition of the document. The control program further causes the terminal device to specify the revision stage of the document based on the marker image in the photographed image, obtain the first additional image registered in association with the marker image from additional images registered on another device, and obtain the second additional image from the additional images registered on another device, the second additional image being associated with each of marker images from the revision stage of the document to a latest revised edition thereof. Displaying includes adding the first additional image at a position of the marker image in the document in the photographed image, and adding the second additional image at an area of a difference from the document of the latest revised edition.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a diagram showing an example of additional image information registered on the server.

FIG. 10 is a diagram showing an example of additional image information registered on the server.

FIG. 11 is a diagram showing an example of an operation performed when a display is provided based on a printed matter of the document in the system.

DESCRIPTION OF THE PREFERRED EMBODIMENTS

Figure 1:
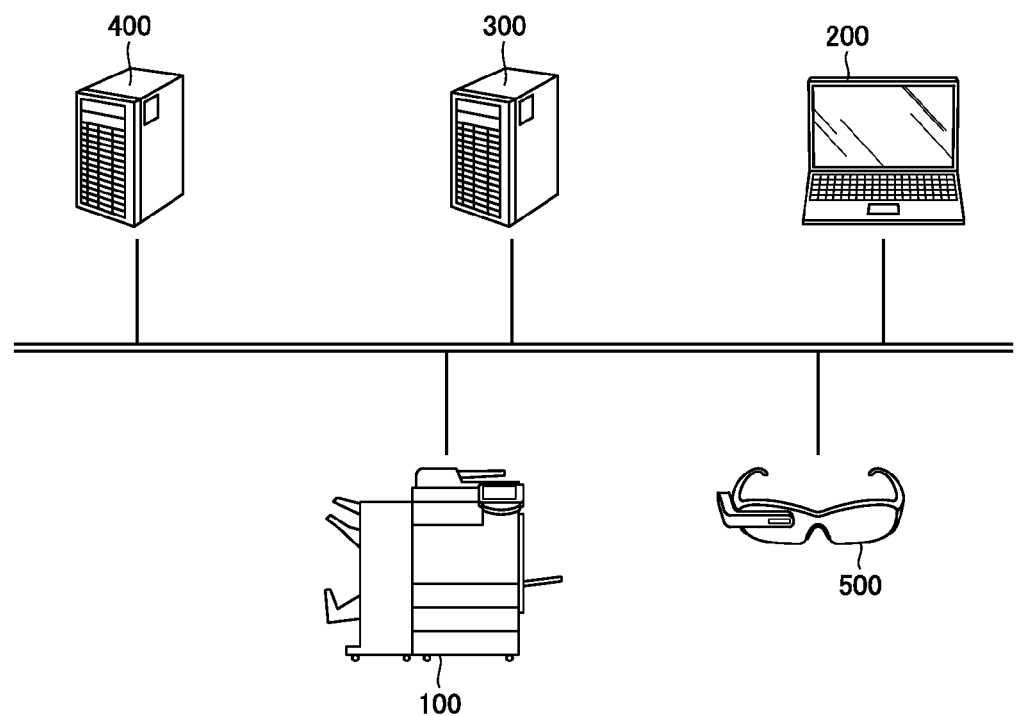
FIG. 1 is a diagram showing an example of the configuration of a document display system (hereinafter simply referred to as a system) according to an embodiment.

The embodiments of the present invention will be hereinafter described with reference to the accompanying drawings. In the following description, the same parts and components are designated by the same reference characters. Names and functions thereof are also the same, and therefore, description thereof will not be repeated.

<System Configuration>

FIG. 1 is a diagram showing an example of the configuration of a document display system according to the present embodiment. Referring to FIG. 1, the present system includes an MFP (Multi-Functional Peripheral) 100 as an example of an image processing apparatus. Furthermore, the present system includes a PC (personal computer) 200 as an example of the document producing apparatus, a server 300, a server 400, and a terminal device 500 that are connected to a network together with MFP 100. The network may be wired or wireless.

Server 300 serves to manage and store document data. Server 400 serves to manage air tag data that will be described later. Terminal device 500 is equipped with a photographing device and a projection device. Terminal device 500 is a wearable display that can be attached to the body or clothes of the user, by way of example.

<Device Configuration>

Figure 2:
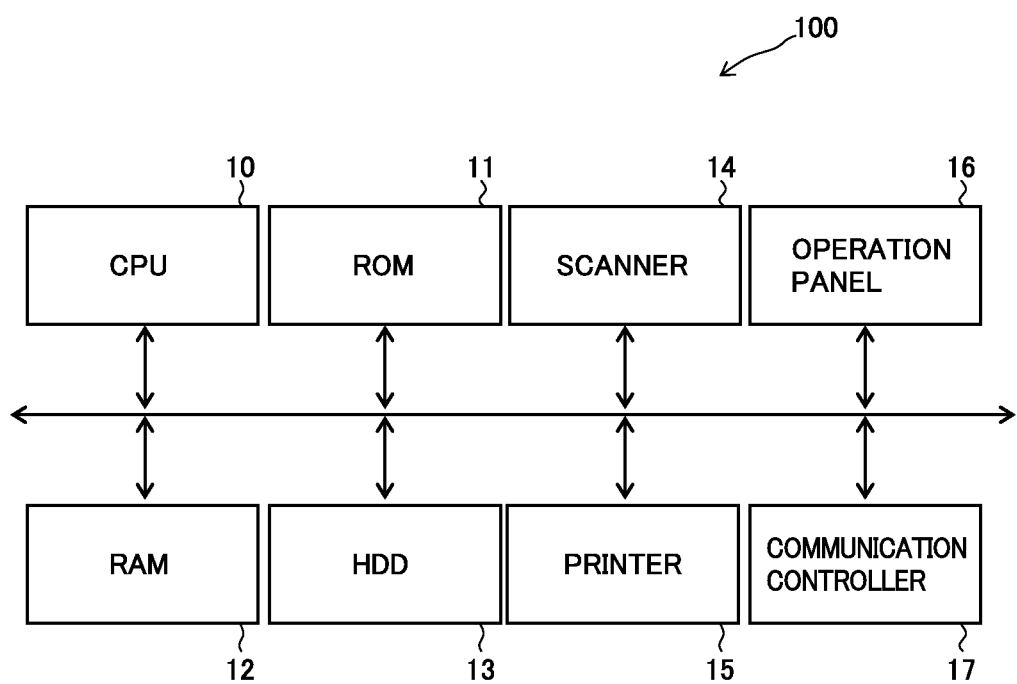
FIG. 2 is a block diagram showing an example of the hardware configuration of an MFP (Multi-Functional Peripheral) included in the system.

FIG. 2 is a block diagram showing an example of the hardware configuration of MFP 100. Referring to FIG. 2, MFP 100 includes a CPU (Central Processing Unit) 10 for controlling the entire apparatus. Furthermore, MFP 100 includes a ROM (Read Only Memory) 11 for storing a program executed by CPU 10, a RAM (Random Access Memory) 12 serving as a working space when executing a program in CPU 10, and an HDD (Hard Disk Drive) 13 that is an example of a storage device for storing image data and the like. Furthermore, MFP 100 includes a scanner 14, a printer 15, and an operation panel 16. Furthermore, MFP 100 includes a communication controller 17 for communicating with other devices within the system.

Figure 3:
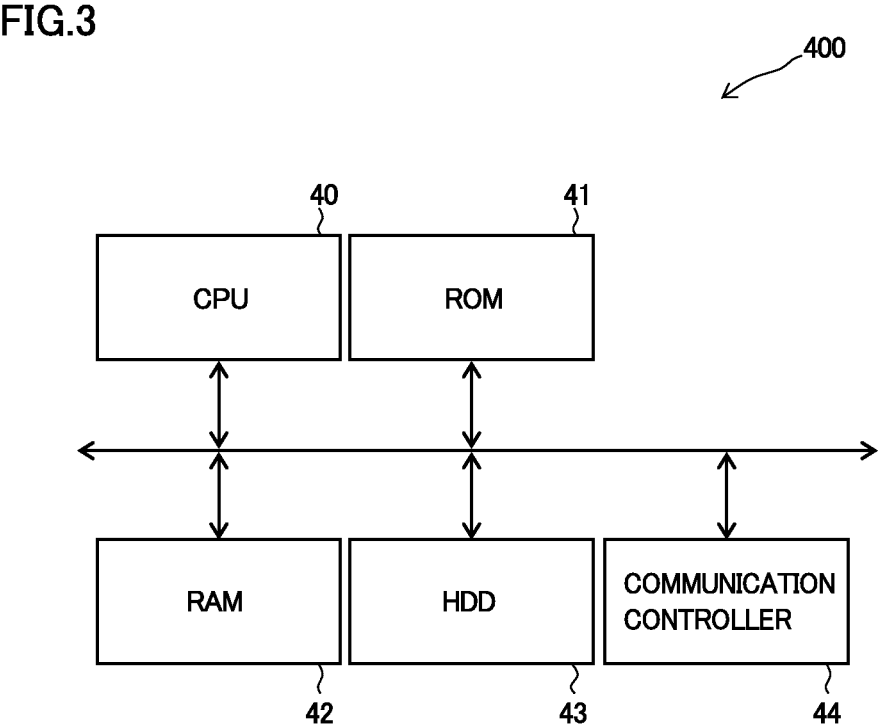
FIG. 3 is a block diagram showing an example of the hardware configuration of a server included in the system.

FIG. 3 is a block diagram showing an example of the hardware configuration of server 400. Referring to FIG. 3, server 400 includes a CPU 40 for controlling the entire apparatus. Furthermore, server 400 includes a ROM 41 for storing programs and various pieces of information that are executed by CPU 40, and a RAM 42 serving as a working space when executing a program in CPU 40. Furthermore, server 400 includes a communication controller 44 for communicating with other devices within the system.

In addition, FIG. 3 shows the hardware configuration of a commonly used server. Accordingly, an example of the hardware configuration of server 300 is also assumed as a hardware configuration shown in FIG. 3, and thus, detailed description thereof will not be repeated.

Figure 4:
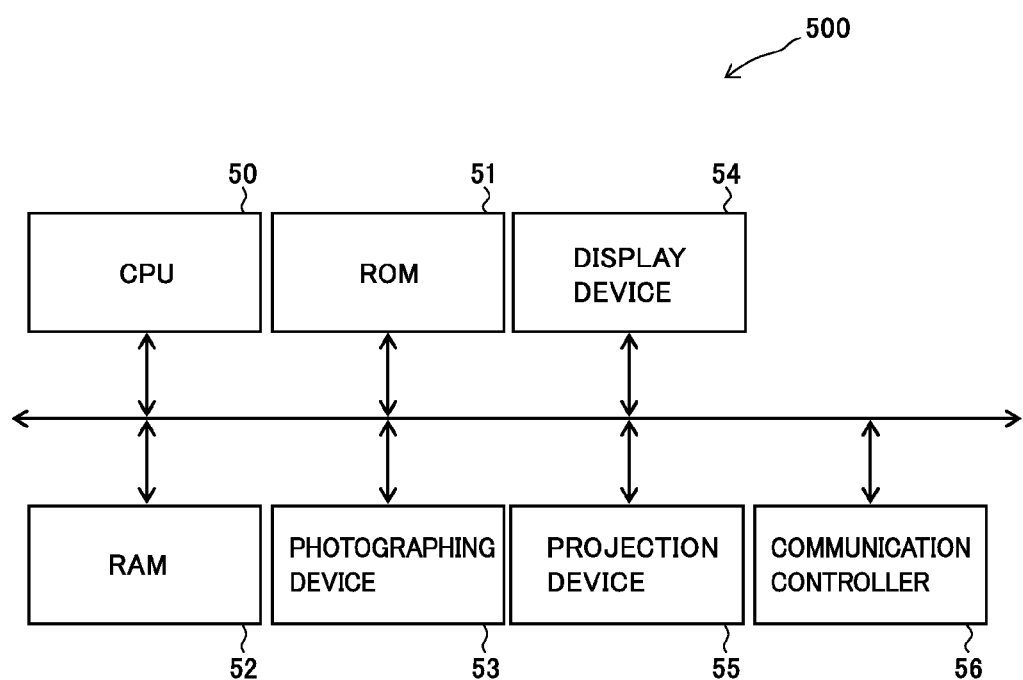
FIG. 4 is a block diagram showing an example of the hardware configuration of a terminal device included in the system.

FIG. 4 is a block diagram showing an example of the hardware configuration of terminal device 500. Referring to FIG. 4, terminal device 500 includes a CPU 50 for controlling the entire apparatus. Furthermore, terminal device 500 includes a ROM 51 for storing programs and various pieces of information that are executed by CPU 50, and a RAM 52 serving as a working space when executing a program in CPU 50. Furthermore, terminal device 500 includes a photographing device 53, a display device 54, and a projection device 55. Furthermore, terminal device 500 includes a communication controller 56 for communicating with other devices within the system.

As set forth above, terminal device 500 is a wearable display attached to the head of the user, by way of example. A specific explanation will be hereinafter given assuming that terminal device 500 is provided as a wearable display.

Display device 54 is a glasses-type device. When terminal device 500 is attached to the user, display device 54 is located at a point in the direction of the user's line of sight. Display device 54 displays an image according to a control signal from CPU 50. Preferably, display device 54 has permeability, and thus, displays an image without completely obstructing the user's field of view.

Photographing device 53 carries out a photographing operation according to a control signal from CPU 50. Photographing device 53 inputs the photographed image obtained by the photographing operation into CPU 50. CPU 50 passes the display data achieved based on the photographed image to display device 54, and gives a display instruction to display device 54, thereby causing display device 54 to display the photographed image obtained by photographing device 53.

An additional image is added to the photographed image displayed on display device 54. The augmented reality technique is utilized for adding an additional image. The additional image is also referred to as AR (Augmented Reality).

The method of adding an additional image to the photographed image is not limited to a specific method. By way of example, the additional image is added by the projecting device projecting this additional image onto the photographed image displayed on display device 54. Alternatively, the additional image may be added by being displayed on display device 54 in the state where it is synthesized so as to be located on the photographed image displayed on display device 54. Hereinafter specifically described will be the case where an additional image is projected by projection device 55 onto display device 54 on which a photographed image is displayed, so that this additional image is added to the displayed photographed image. Therefore, projection device 55 included in terminal device 500 can be regarded as a specific example of the addition device for adding an additional image to the displayed image.

Projection device 55 projects an image onto display device 54 according to a control signal from CPU 50. Projection device 55 projects the instructed image onto display device 54 with the permeability according to the control signal from CPU 50.

The user who wears terminal device 500 can see an image displayed on display device 54, and an image projected by projection device 55 so as to be superimposed on the image.

<Summary of Operation>

(Document Registration)

Figure 5:
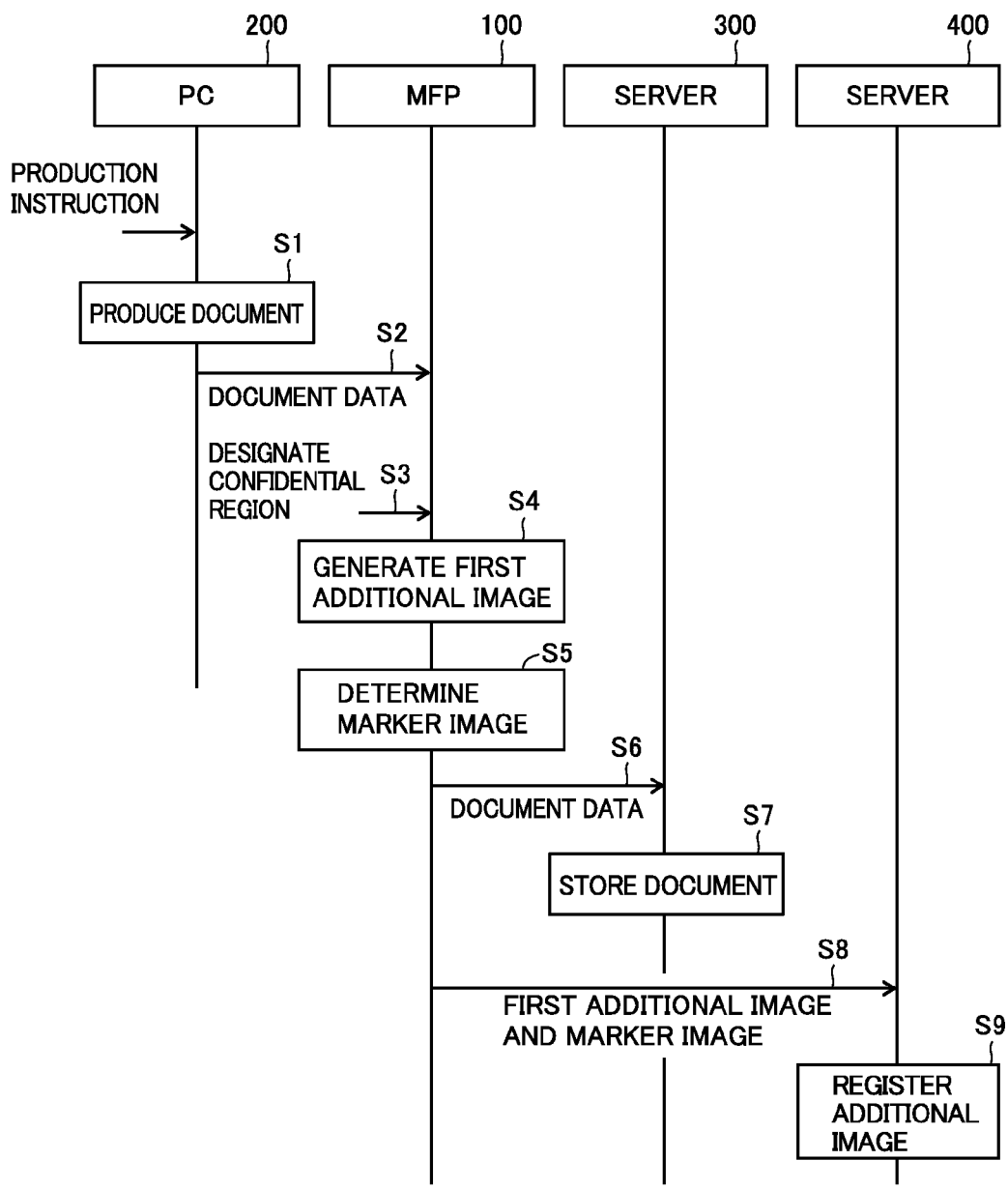
FIG. 5 is a diagram showing an example of an operation performed when a document is registered in the system.

FIG. 5 is a diagram showing an example of an operation performed when a document is registered in the present system. Referring to FIG. 5, a PC 200 produces a document according to a production instruction from the user (step S1). Then, PC 200 transfers document data to MFP 100 according to the user's instruction to complete the production (step S2).

MFP 100 accepts an operation for designating a confidential region from the user (step S3). The confidential region means a region including confidential information within a document. The confidential region is a region including information for internal use only, for example, when the document includes in-company information.

MFP 100 generates the first additional image based on the image in the region designated by the user's operation (step S4). The additional image is intended to be added to the displayed photographed image by projection device 55 projecting this additional image onto display device 54. The first additional image is intended to show the confidential information within the designated region.

Furthermore, MFP 100 determines a marker image showing the revised edition number of the document (step S5). The marker image is determined for each document and for each revised edition. MFP 100 may store a plurality of types of marker images in advance and selects a marker image from these plurality of marker images at random. When a document is newly registered, the revised edition number of this document is 1. Accordingly, the marker image showing the revised edition number of the document as 1 is determined in step S5.

MFP 100 transfers document data to server 300 (step S6). Thereby, the document data is stored in server 300 (step S7). In the above-described step S6, MFP 100 transfers also the information showing the confidential region designated in the document to server 300. Accordingly, the information showing the confidential region set for the document data is stored in server 300 together with this document data.

Furthermore, MFP 100 transfers the generated first additional image and the determined marker image to server 400 (step S8). Thereby, the first additional image is registered on server 400 in association with the marker image (step S9).

FIG. 6 is a diagram showing an example of additional image information registered on server 400. Referring to FIG. 6, server 400 registers, on HDD 43, the first additional image generated in MFP 100 as additional image information in association with the marker image showing the revised edition number (ver. 1) of the document. Preferably, MFP 100 sets the user who has a browsing right for the confidential information according to the user's operation. The browsing right is information showing whether browsing is allowed or not when the document is displayed. In this case, server 400 further associates the information of the user who has the browsing right for the additional image with the first additional image, and registers the resultant image as additional image information on HDD 43.

(Printing)

By designating the document data stored in server 300, the user who has logged in to MFP 100 can cause MFP 100 to perform a print operation based on the document data.

MFP 100 that has accepted designation of the document data to be printed refers to server 400 to confirm whether the additional image information of the document is registered or not. Then, in the case where the additional image information of the designated document is registered on server 400, MFP 100 replaces the confidential region in the designated document with a marker image, and then prints it.

Figure 7A:
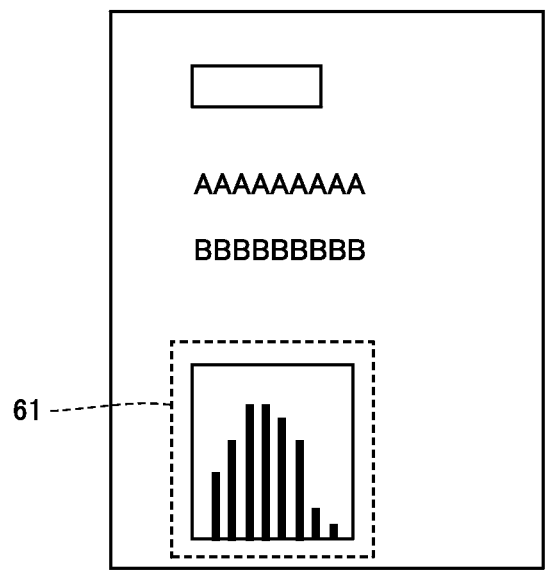
FIGS. 7A and 7B are diagrams showing specific examples of document data and a printed document, respectively.
Figure 7B:
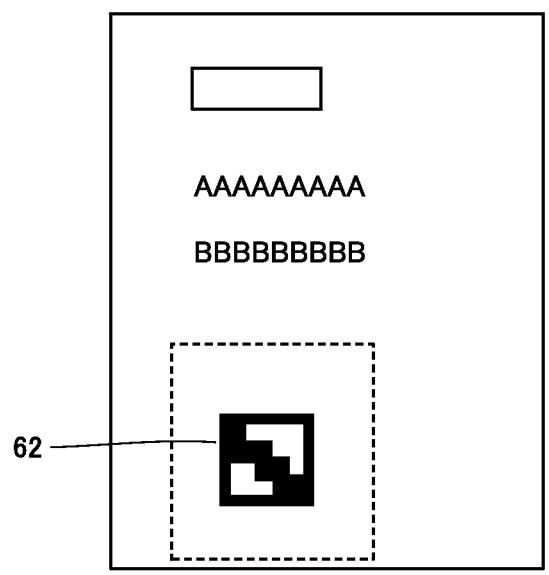

FIGS. 7A and 7B are diagrams showing specific examples of document data and a printed document, respectively. It is assumed that a confidential region 61 is set in the document designated as an object to be printed, as shown in FIG. 7A. Then, MFP 100 reads a marker image from the additional image information in server 400. Then, MFP 100 replaces confidential region 61 in the document data with the marker image, and prints the document data. Thereby, the user obtains a printed matter in which a marker image 62 is disposed at a portion where confidential region 61 has been located, as shown in FIG. 7B. In other words, the user cannot know the contents of confidential region 61 from the printed matter itself.

(Document Update)

Figure 8A:
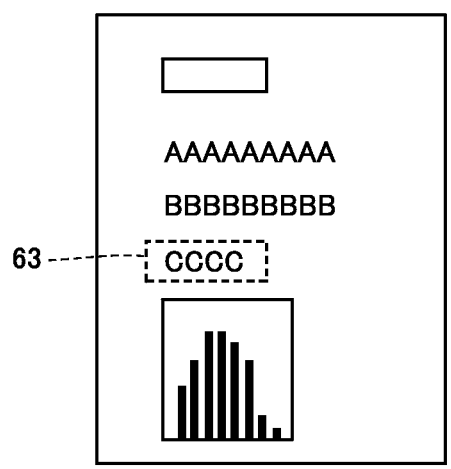
FIGS. 8A to 8C are diagrams showing specific examples of document editing.
Figure 8B:
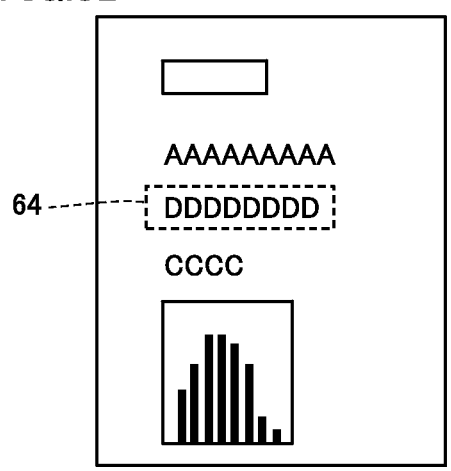

Once the document data is registered on server 300 by the operation in FIG. 5, the document data may be edited by PC 200 or the like. FIGS. 8A and 8B each are a diagram showing a specific example of document editing. FIGS. 8A and 8B each show a specific example of editing for the document in FIG. 7A.

Referring to FIG. 8A, editing a document is adding (additionally writing) information to a document by way of example. In the document after editing shown in FIG. 8A, a new character string 63 is added to the document before editing shown in FIG. 7A.

Referring to FIG. 8B, editing a document is correcting at least a part of the document by way of example. In the document after editing shown in FIG. 8B, the character string in a part of the document before editing shown in FIG. 8A is corrected to a new character string 64.

Figure 8C:
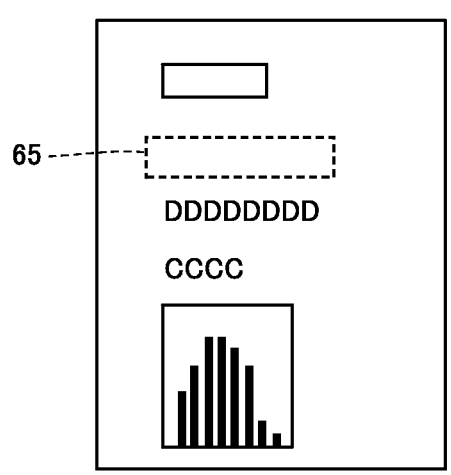

Referring to FIG. 8C, editing a document is deleting at least a part of the document by way of example. In the document after editing shown in FIG. 8C, the character string in a part of the document before editing shown in FIG. 8B is changed into a region 65 without characters, that is, the character string is deleted.

Figure 9:
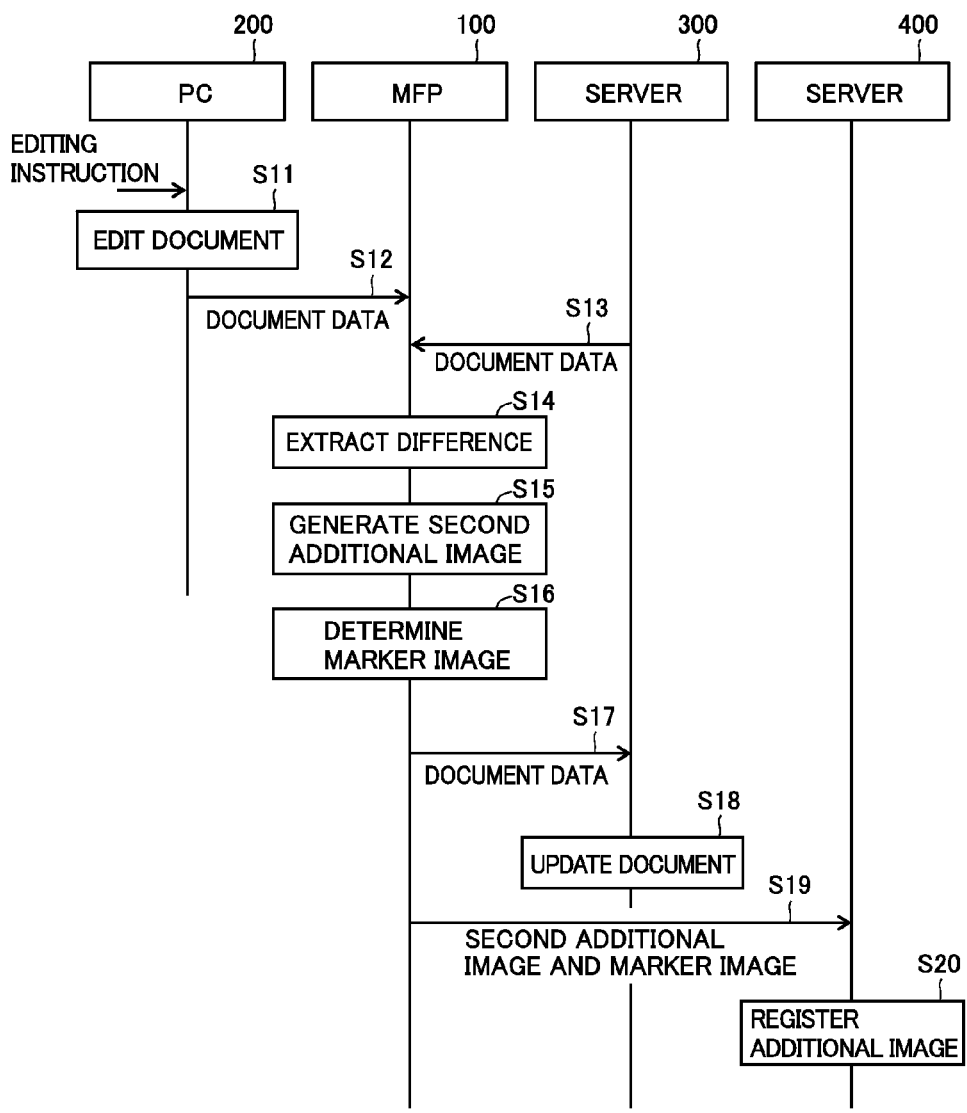
FIG. 9 is a diagram showing an example of an operation performed when a document is updated in the system.

FIG. 9 is a diagram showing an example of an operation performed when a document is updated in the present system. Referring to FIG. 9, PC 200 edits the document designated according to the editing instruction from the user (step S11). Then, PC 200 transfers the document data after editing to MFP 100 according to the user's instruction to complete editing (step S12).

When MFP 100 accepts an input of the document data after editing, it obtains document data before editing from server 300 (step S13). Then, MFP 100 compares these data with each other and extracts a difference therebetween (step S14). Preferably, MFP 100 further extracts a position on the document at which the above-described difference occurs.

For example, when the document in FIG. 7A is edited as with editing shown in FIG. 8A, in step S14, MFP 100 extracts character string 63 as a difference, and further extracts the position of character string 63. For example, when the document shown in FIG. 8A is edited as with editing shown in FIG. 8B, in step S14, MFP 100 extracts character string 64 as a difference, and further extracts the position of character string 64. For example, when the document shown in FIG. 8B is edited as with editing shown in FIG. 8C, in step S14, MFP 100 extracts region 65 as a difference, and further extracts the position of region 65.

MFP 100 generates the second additional image showing the extracted difference (step S15). Furthermore, MFP 100 determines a marker image showing the revised edition number of the document (step S16).

Preferably, MFP 100 generates the second additional image in accordance with the type of editing in step S15. Editing includes, for example, additionally writing, correcting, and deleting as described above. MFP 100 compares the document before editing with the document after editing, to extract a difference therebetween, thereby specifying the editing contents and also specifying the type of editing. MFP 100 stores, in advance, the characteristics of the second additional image for each type of editing. Then, MFP 100 generates the second additional image having the characteristics in accordance with the specified type of editing.

For example, as having been described with reference to FIG. 8A, in the case where the document is edited by additional writing, MFP 100 generates the second additional image that has permeability (that is transparent). For example, as having been described with reference to FIG. 8B, in the case where the document is edited by correcting, MFP 100 generates the second additional image that does not have permeability (that is non-transparent). For example, as having been described with reference to FIG. 8C, in the case where the document is edited by deleting, MFP 100 generates the second additional image that does not have permeability (that is non-transparent) and shows a strikethrough line (for example, a double line).

MFP 100 transfers the document data after editing to server 300 (step S17). Accordingly, the document data before editing that is stored in server 300 is updated to the document data after editing (step S18).

Furthermore, MFP 100 transfers the generated second additional image and the determined marker image to server 400 (step S19). Thereby, the first additional image and the second additional image that have already been registered are registered on server 400 in association with a marker image (step S20). Preferably, MFP 100 transfers the position, which is located on the document at which a difference occurs, to server 400 together with the generated second additional image. Thereby, the second additional image is registered on server 400 together with the position on the document at which a difference occurs. The position on the document at which a difference occurs corresponds to the position at which the second additional image is added in the display process, which will be described later.

In addition, the user who has a browsing right for the editing contents may be set for the document data after editing. In this case, the second additional image is registered, together with the information showing the user who has a browsing right, on server 400 in association with the corresponding marker image.

FIG. 10 is a diagram showing an example of additional image information registered on server 400. FIG. 10 shows an example of the additional image information registered on server 400, which is obtained after the document is edited several times after the additional image information in FIG. 6 has been registered. Specifically, FIG. 10 shows an example of the additional image information registered on server 400 after the document in each of FIGS. 7A and 7B is subjected sequentially to editing in FIG. 8A to editing in FIG. 8C.

Referring to FIG. 10, server 400 registers, on HDD 43, the first additional image and the second additional image that shows the editing contents in its revised edition as additional image information in association with each marker image showing the revised edition number (versions 1 to 4) for each revised edition of the document. Preferably, server 400 also registers the position of the difference caused by editing, together with the second additional image. It is to be noted that the revised edition number is merely an example of an index that shows the revision stage of the document. The index showing the revision stage of the document is not limited to the revised edition number, but may be other information including a date and the like.

Specifically, the second revised edition (ver. 2) of the document in FIG. 7A corresponds to a document in FIG. 8A. In this case, the additional image information of the second revised edition (ver. 2) includes the first additional image associated with the marker image showing the revised edition number as 2, as well as the second additional image showing character string 63 associated with this marker image. Preferably, the additional image information further includes a position of character string 63.

Specifically, the third revised edition (ver. 3) of the document in FIG. 7A corresponds to a document in FIG. 8B. In this case, the additional image information of the third revised edition (ver. 3) includes the first additional image associated with a marker image showing the revised edition number as 3, as well as the second additional image showing character string 64 associated with this marker image. Preferably, the additional image information further includes a position of character string 64.

Specifically, the fourth revised edition (ver. 4) of the document in FIG. 7A corresponds to a document in FIG. 8C. In this case, the additional image information of the fourth revised edition (ver. 4) includes the first additional image associated with a marker image showing the revised edition number as 4, as well as the second additional image showing a region 65 associated with this marker image. Preferably, the additional image information further includes a position of region 65.

(Display)

FIG. 11 is a diagram showing an example of an operation performed when a display is provided based on a printed matter of the document in the present system. Referring to FIG. 11, terminal device 500 performs a photographing operation according to the user's instruction to take a photograph (step S31). Terminal device 500 subjects the photographed image obtained in step S31, for example, to a matching process, to detect a marker image from the photographed image (step S32).

Terminal device 500 compares a marker image from the photographed image and a marker image included in the additional image information registered on server 400, thereby specifying the document included in the photographed image and the revised edition number of this document (step S33).

From server 400, terminal device 500 obtains the additional image registered in association with the marker image (step S34). Terminal device 500 causes display device 54 to display a photographed image (step S35). Furthermore, terminal device 500 projects an additional image onto the photographed image displayed on display device 54, thereby adding the additional image (step S36).

The additional image includes the first additional image and the second additional image. Specifically, in step S36, terminal device 500 adds the first additional image at a position of the marker image in the photographed image. Furthermore, in step S36, terminal device 500 adds the second additional image at a position of the difference between the document in the photographed image and the document before revision.

More specifically, terminal device 500 extracts, from the additional image information registered on server 400, the second additional image associated with each of marker images from the revised edition number of the document that is specified based on the marker image in the photographed image up to the latest revised edition thereof, and then, obtains the second additional image in step S34. Then, in step S36, terminal device 500 adds all of the obtained second additional images at corresponding positions in the photographed image.

Figure 12A:
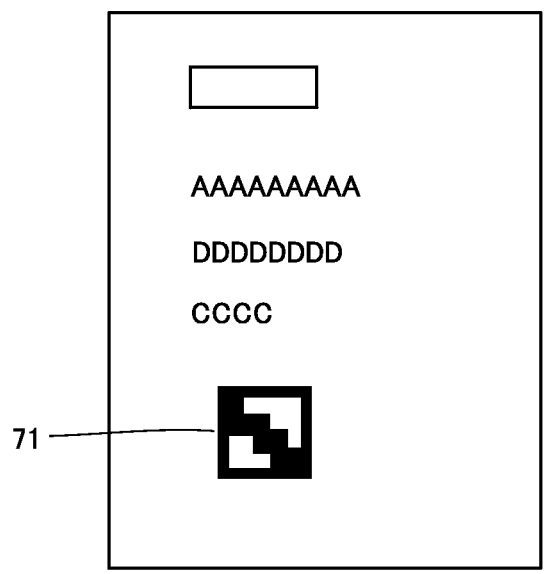
FIGS. 12A and 12B each are a diagram showing an example of a display on the display device of the terminal device.
Figure 12B:
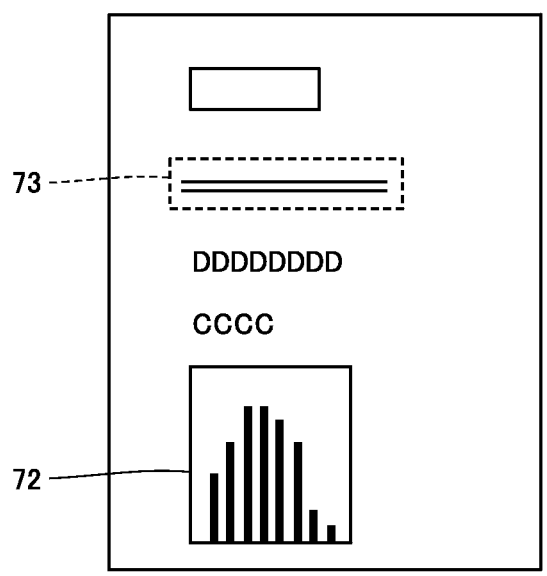
Figure 13A:
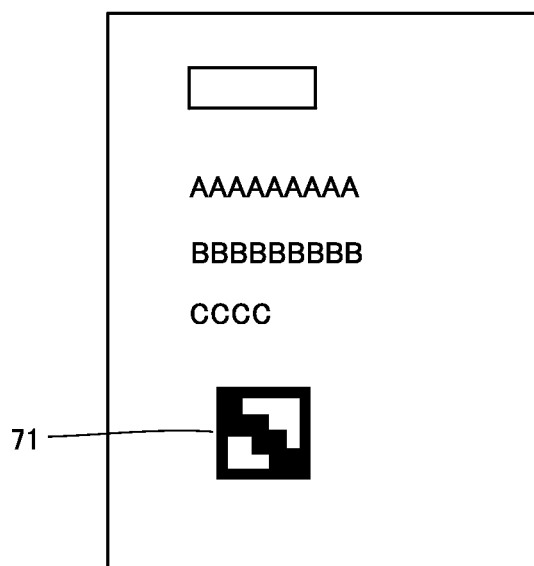
FIGS. 13A and 13B each are a diagram showing an example of a display on the display device of the terminal device.
Figure 13B:
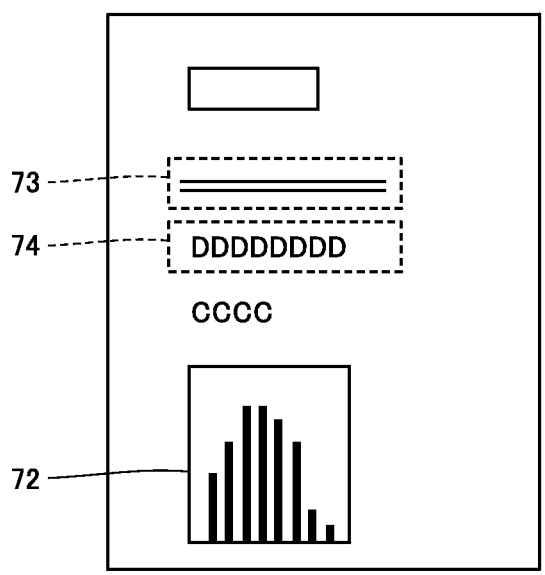
Figure 14A:
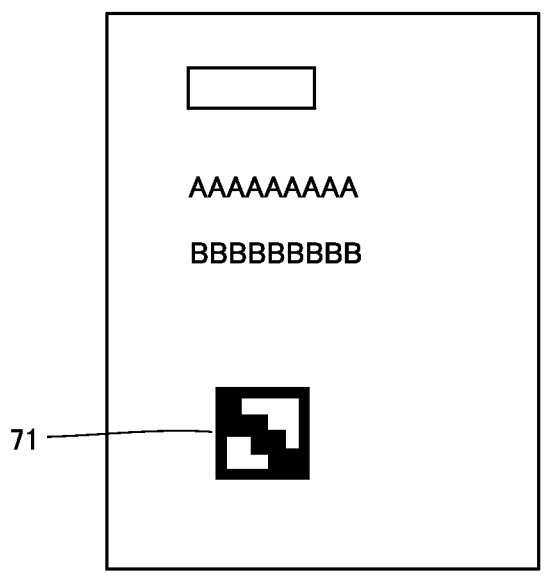
FIGS. 14A and 14B each are a diagram showing an example of a display on the display device of the terminal device.
Figure 14B:
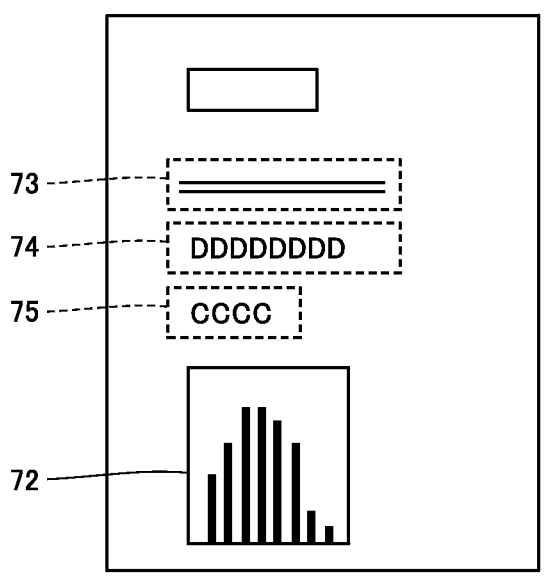

FIGS. 12A to 14B each are a diagram showing an example of a display on a display device of terminal device 500. FIGS. 12A, 13A and 14A each show a document included in a photographed image while FIGS. 12B, 13B and 14B each show a display example. FIGS. 12A and 12B each show a display example in the case where the document included in the photographed image corresponds to the third revised edition (ver. 3) in the above-described example. FIGS. 13A and 13B each show a display example in the case where the document included in the photographed image corresponds to the second revised edition (ver. 2) in the above-described example. FIGS. 14A and 14B each show a display example in the case where the document included in the photographed image corresponds to the first revised edition (ver. 1) in the above-described example.

The document of the fourth revised edition (ver. 4) that is the latest version is obtained by editing the document of the third revised edition (ver. 3) shown in FIG. 12A for deleting a partial region (in this example, a character string "AAAAAAAAA"). In the case where the document included in the photographed image is a document of the third revised edition (ver. 3), terminal device 500 extracts, from server 400, the first additional image and the second additional image that is associated with the marker image showing the fourth revised edition (ver. 4), and then, obtains these first additional image and second additional image. Then, terminal device 500 adds the second additional image to the photographed image of the third revised edition (ver. 3).

In other words, as shown in FIG. 12B, the confidential information that is the first additional image is added onto a marker image 71 in the document of the third revised edition (ver. 3) shown in FIG. 12A. Furthermore, as shown in FIG. 12B, onto a character string "AAAAAAAAA" included in the document of the third revised edition (ver. 3) shown in FIG. 12A and corresponding to a difference from the document of the fourth revised edition (ver. 4) that is the next revised edition, an image 73 including a strikethrough line and corresponding to the second additional image associated with this fourth revised edition is added. Thereby, using terminal device 500, the user who possesses a document of the third revised edition (ver. 3) can view the document of the fourth revised edition (ver. 4) that is the latest version.

Furthermore, the document of the fourth revised edition (ver. 4) that is the latest version is obtained by editing the document of the second revised edition (ver. 2) shown in FIG. 13A for deleting a partial region (in this example, a character string "AAAAAAAAA") and correcting a partial region (in this example, a character string "BBBBBBBBB").

In the case where the document included in the photographed image is a document of the second revised edition (ver. 2), terminal device 500 extracts, from server 400, the first additional image, the second additional image associated with the marker image showing the fourth revised edition (ver. 4) and the second additional image associated with the marker image showing the third revised edition (ver. 3), and then, obtains these first additional image and second additional images. Then, terminal device 500 adds these second additional images to the photographed image of the second revised edition (ver. 2).

Specifically, as shown in FIG. 13B, confidential information 72 that is the first additional image is added onto marker image 71 in the document of the second revised edition (ver. 2) shown in FIG. 13A. Also, as shown in FIG. 13B, onto a character string "AAAAAAAAA" included in the document of the second revised edition (ver. 2) shown in FIG. 13A and corresponding to a difference from the document of the fourth revised edition (ver. 4) that is the latest version, image 73 including a strikethrough line and corresponding to the second additional image associated with the fourth revised edition is added. Furthermore, as shown in FIG. 13B, onto a character string "BBBBBBBBB" included in the document of the second revised edition (ver. 2) shown in FIG. 13A and corresponding to a difference from the document of the fourth revised edition (ver. 4) that is the latest version, an image 74 showing a character string "DDDDDDDDD" and corresponding to the second additional image associated with the third revised edition is added. Thereby, using terminal device 500, the user who possesses the document of the second revised edition (ver. 2) can view the document of the fourth revised edition (ver. 4) that is the latest version.

Furthermore, the document of the fourth revised edition (ver. 4) that is the latest version is obtained by editing the document of the first revised edition (ver. 1) shown in FIG. 14A for deleting a partial region (in this example, a character string "AAAAAAAAA"), correcting a partial region (in this example, a character string "BBBBBBBBB"), and making a correction for additional writing. In the case where the document included in the photographed image is a document of the first revised edition (ver. 1), terminal device 500 extracts, from server 400, the first additional image, the second additional image associated with the marker image showing the fourth revised edition (ver. 4), the second additional image associated with the marker image showing the third revised edition (ver. 3), and the second additional image associated with the marker image showing the second revised edition (ver. 2), and then, obtains these additional images. Then, terminal device 500 adds these second additional images to the photographed image of the first revised edition (ver. 1).

In other words, as shown in FIG. 14B, confidential information 72 that is the first additional image is added onto marker image 71 in the document of the first revised edition (ver. 1) shown in FIG. 14A. Furthermore, as shown in FIG. 14B, onto a character string "AAAAAAAAA" included in the document of the first revised edition (ver. 1) shown in FIG. 14A and corresponding to a difference from the document of the fourth revised edition (ver. 4) that is the latest version, image 73 including a strikethrough line and corresponding to the second additional image associated with the fourth revised edition is added. Furthermore, as shown in FIG. 14B, onto a character string "BBBBBBBBB" included in the document of the first revised edition (ver. 1) shown in FIG. 14A and corresponding to a difference from the document of the fourth revised edition (ver. 4) that is the latest version, an image 74 showing a character string "DDDDDDDDD" and corresponding to the second additional image associated with the third revised edition is added. Furthermore, as shown in FIG. 14B, onto a blank corresponding to a difference between the document of the first revised edition (ver. 1) shown in FIG. 14A and the document of the second revised edition (ver. 4) that is the latest version, an image 75 showing a character string "CCCC" and corresponding to the second additional image associated with the fourth revised edition is added. Thereby, using terminal device 500, the user who possesses the document of the first revised edition (ver. 1) can view the document of the fourth revised edition (ver. 4) that is the latest version.

In addition, in the case where the user who has a right to browse confidential information is set as described above, terminal device 500 authenticates whether a login user has a browsing right or not when the first additional image is added. When authentication succeeds, terminal device 500 adds the first additional image at the position of the marker image. When authentication does not succeed, terminal device 500 does not add the first additional image. Thereby, only in the case of the user who has a browsing right, the first additional image is added at the position of the marker image. In other words, only in the case where the user who has a browsing right utilizes terminal device 500, confidential information is displayed.

Furthermore, as described above, in the case where the user who has a right to browse the editing contents is set, terminal device 500 authenticates whether the login user has a browsing right or not when the second additional image is added. When authentication succeeds, terminal device 500 adds the second additional image at the corresponding position. When authentication does not succeed, terminal device 500 does not add the second additional image. Thereby, only in the case of the user who has a browsing right, the second additional image is added. In other words, only in the case where the user who has a browsing right utilizes terminal device 500, the document editing contents are displayed.

Preferably, the user who has a browsing right is set for each editing. In other words, the user who has a browsing right may vary depending on the revised edition number of the document. In this case, terminal device 500 adds, at the corresponding position, only the second additional image of a plurality of the extracted second additional images for which the login user has a browsing right. Therefore, the document editing contents are displayed only in a range in which the login user of terminal device 500 is allowed to browse.

<Functional Configuration>

Figure 15:
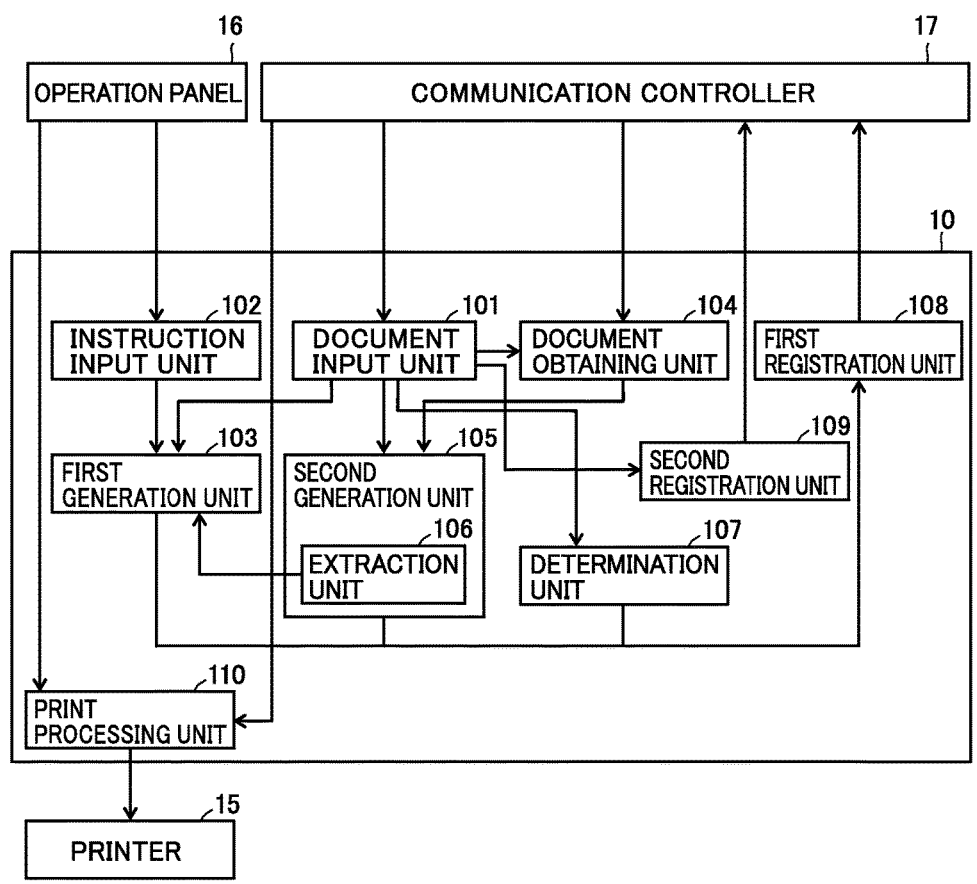
FIG. 15 is a block diagram showing an example of a functional configuration of the MFP.

FIG. 15 is a block diagram showing an example of the functional configuration of MFP 100 for performing the above-described operation. Each function in FIG. 15 is implemented mainly on CPU 10 of MFP 100 by CPU 10 reading the program stored in ROM 11 onto RAM 12 and executing the program. However, at least a part of the function may be implemented by hardware shown in FIG. 2 or hardware such as an electrical circuit (not shown).

Referring to FIG. 15, CPU 10 of MFP 100 includes a document input unit 101 for accepting an input of the document data from PC 200 through communication controller 17. Furthermore, CPU 10 includes an instruction input unit 102 for accepting the user's instruction input that is shown by an operation signal from operation panel 16. Instruction input unit 102 accepts the user's instruction input that designates a confidential region in the input document.

Furthermore, CPU 10 includes a first generation unit 103 for generating the first additional image, and a second generation unit 105 for generating the second additional image. First generation unit 103 generates, as the first additional image, an image showing the contents of a confidential region in the input document that is designated by the user's instruction.

Furthermore, CPU 10 includes a document obtaining unit 104 for obtaining a document before revision from server 300 through communication controller 17. In the case where the input document is a document obtained by editing the document already stored in server 300, document obtaining unit 104 obtains a document before revision from server 300.

Preferably, second generation unit 105 includes an extraction unit 106. In the case where the input document is a document obtained by editing the document already stored in server 300, extraction unit 106 compares the input document with the document before revision of this document, and extracts a difference therebetween. Second generation unit 105 generates an image showing this difference as the second additional image.

Preferably, in the case where an area of the difference is included in the confidential region of the document data, first generation unit 103 synthesizes the image showing the above-described difference with the first additional image.

Furthermore, CPU 10 includes a determination unit 107 for determining a marker image showing the document and the revised edition number, a first registration unit 108, and a second registration unit 109.

First registration unit 108 transfers the first additional image and the second additional image to server 400 together with the marker image, and registers the first additional image and the second additional image on server 400 in association with the marker image. Second registration unit 109 registers the input document data on server 300.

Preferably, CPU 10 further includes a print processing unit 110 for performing a process of printing document data by printer 15. Print processing unit 110 replaces the image in the confidential region set for the document data to be printed with a marker image, and prints the resultant image.

Figure 16:
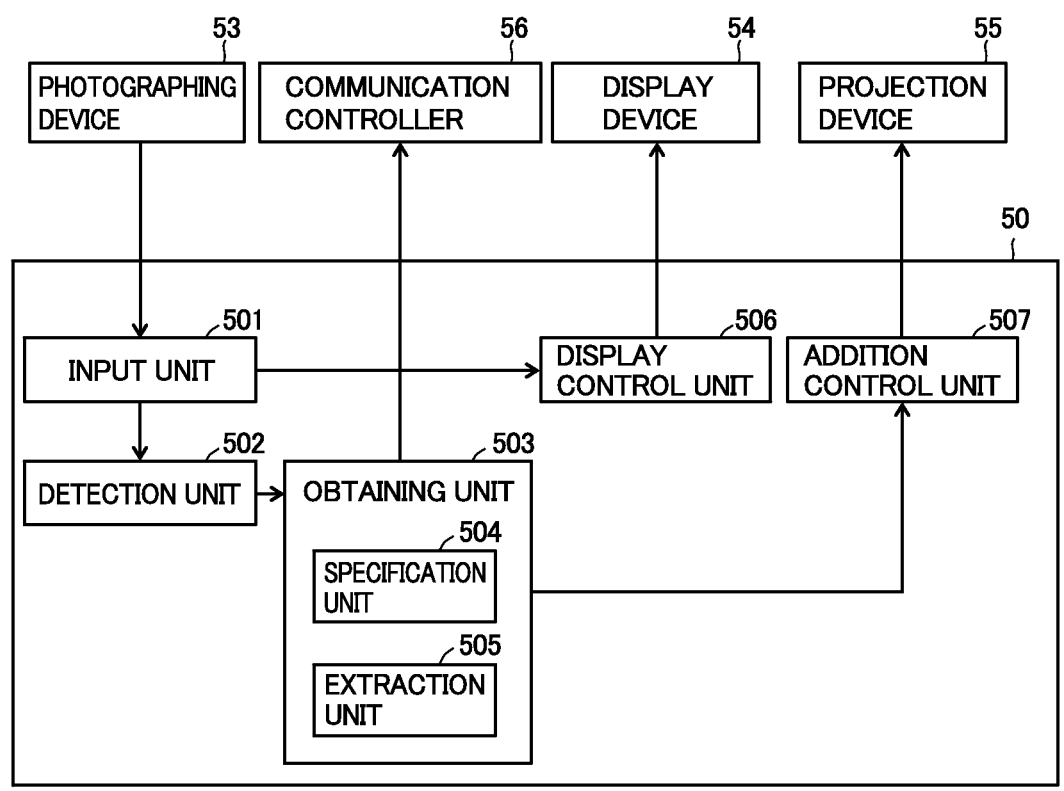
FIG. 16 is a block diagram showing an example of the functional configuration of the terminal device.

FIG. 16 is a block diagram showing an example of the functional configuration of terminal device 500 for performing the above-described operation. Each function in FIG. 16 is implemented mainly on CPU 50 of terminal device 500 by CPU 50 reading the program stored in ROM 51 onto RAM 52 and executing the program. However, at least a part of the function may be implemented by hardware shown in FIG. 4 or hardware such as an electrical circuit (not shown).

Referring to FIG. 16, CPU 50 of terminal device 500 includes an input unit 501 for accepting an input of a photographed image from photographing device 53, and a detection unit 502 for detecting a marker image from the photographed image.

Furthermore, CPU 50 includes an obtaining unit 503 for obtaining, from server 400, an additional image registered in association with the marker image in the photographed image. Obtaining unit 503 includes a specification unit 504 and an extraction unit 505. Specification unit 504 specifies the revised edition number of the document based on the marker image in the photographed image. From the additional images registered on server 400, extraction unit 505 extracts the second additional image associated with each of marker images from the revised edition number of the document up to the latest revised edition thereof.

Furthermore, CPU 50 includes a display control unit 506 for controlling a display on display device 54, and an addition control unit 507 for controlling addition in projection device 55. Display control unit 506 causes display device 54 to display a photographed image. Addition control unit 507 controls projection device 55 to add the first additional image at the position of the marker image in the document included in the photographed image. Furthermore, addition control unit 507 controls projection device 55 to add the second additional image at an area of the document included in the photographed image and corresponding to the difference from the document before revision. When there are a plurality of second additional images associated with marker images from the revised edition number of the document up to the latest revised edition thereof, addition control unit 507 controls projection device 55 to add these plurality of second additional images at their respective areas of the differences.

<Operation Flow>

Figure 17:
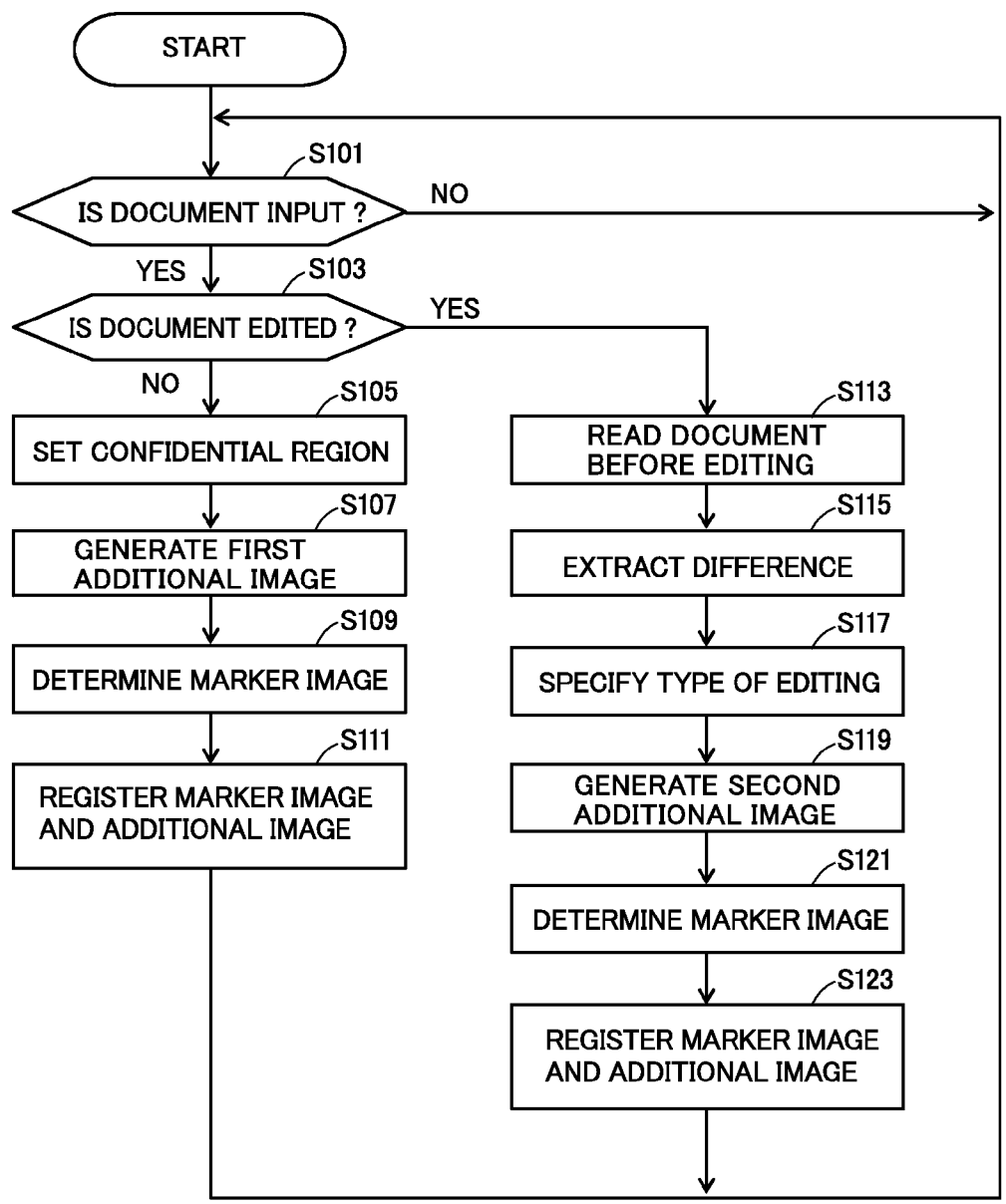
FIG. 17 is a flowchart showing an example of an operation of the MFP.

FIG. 17 is a flowchart showing an example of an operation of MFP 100. The operation shown in the flow chart in FIG. 17 is implemented by CPU 10 of MFP 100 reading the program stored in ROM 11 and executing the program, and causing each function in FIG. 15 to be performed.

Referring to FIG. 17, when MFP 100 accepts an input of the document data from PC 200 (YES in step S101), CPU 10 determines whether the document data is document data that is newly registered or document data that is obtained by editing the document already registered on server 300.

When the input document data is to be newly registered (NO in step S103), CPU 10 accepts the user operation for designating a confidential region on the document. Then, CPU 10 sets the confidential region in the document data according to the user's operation (step S105).

CPU 10 generates the first additional image showing the information included in the confidential region (step S107). Furthermore, CPU 10 determines the marker image that shows the document and the revised edition number (step S109). Then, CPU 10 transfers the marker image and the first additional image to server 400, and registers the first additional image on server 400 in association with the marker image (step S111).

When the input document data is document data obtained by editing the already registered document (YES in step S103), CPU 10 reads the input document data before editing from server 300 (step S113). Then, CPU 10 compares the read document data with the input document data, thereby extracting a difference therebetween (step S115).

CPU 10 generates the second additional image showing the extracted difference (step S119). Preferably, CPU 10 specifies the type of editing based on the extracted difference (step S117). The type of editing includes correction, additional writing, and deletion. CPU 10 stores, in advance, the characteristics of the second additional image in accordance with the type of editing. Then, in step S119, CPU 10 generates the second additional image with the characteristics in accordance with the type of editing. For example, in the case where the type of editing is correction, CPU 10 generates the second additional image that does not have permeability (that is non-transparent) in step S119. For example, in the case where the type of editing is additional writing, CPU 10 generates the second additional image that has permeability (that is transparent) in step S119. For example, in the case where the type of editing is deletion, CPU 10 generates the second additional image that does not have permeability (that is non-transparent) and shows a strikethrough line (for example, a double line) in step S119.

Furthermore, CPU 10 determines the marker image showing the document and the revised edition number (step S121). Then, CPU 10 transfers the marker image and the second additional image to server 400, and registers the second additional image on server 400 in association with the marker image (step S123).

Figure 18:
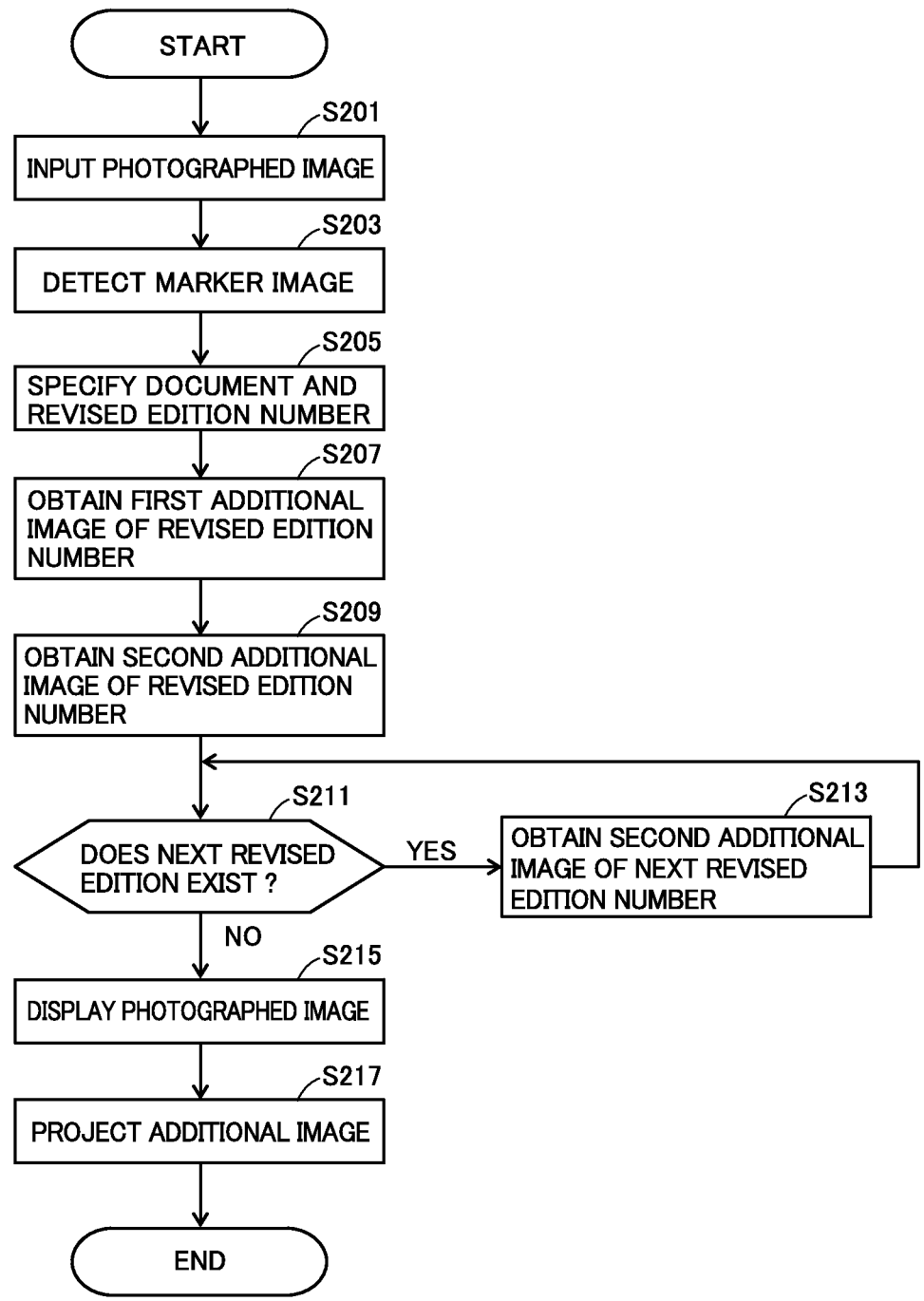
FIG. 18 is a flowchart showing an example of an operation of the terminal device.

FIG. 18 is a flowchart showing an example of the operation of terminal device 500. The operation shown in the flow chart in FIG. 18 is implemented by CPU 50 of terminal device 500 reading the program stored in ROM 51 onto RAM 52 and executing the program, and causing each function shown in FIG. 16 to be performed.

Referring to FIG. 18, as photographing device 53 of terminal device 500 performs a photographing operation according to the user's instruction, a photographed image is input into terminal device 500 (step S201). CPU 50 analyzes the photographed image and detects a marker image (step S203). Based on the detected marker image, CPU 50 specifies a document included in the photographed image and the revised edition number of this document (step S205).

CPU 50 obtains, from server 400, the first additional image that is registered in association with the marker image of the specified revised edition number of the specified document (step S207). Furthermore, CPU 50 extracts, from server 400, the second additional image registered in association with the marker image of the specified revised edition number, and thus, obtains the second additional image (step S209).

For the specified document, when the second additional image associated with the marker image having the second highest revised edition number next to the specified revised edition number is registered on server 400 (YES in step S211), CPU 50 extracts, from server 400, the second additional image associated with the marker image having the second highest revised edition number next to the specified revised edition number, and thus, obtains the second additional image (step S213). CPU 50 repeats the above-described steps S211 and S213 until the revised edition number reaches the latest revised edition number of the document, thereby extracting, from server 400, the second additional image associated with each of marker images from the revised edition number of the document included in the photographed image up to the latest revised edition thereof, and thus, obtaining the second additional image.

When all of the second additional images associated with the marker images up to the latest revised edition are obtained (NO in step S211), CPU 50 causes display device 54 to display the photographed image that is input in the above-described step S201 (step S215). Furthermore, CPU 50 adds the obtained first additional image at the position of the marker image of the document in the photographed image. Furthermore, CPU 50 adds each obtained second additional image at a corresponding area of the difference from each document before revision (step S217). In addition, in the case where the user who has a right to browse the additional image is set, CPU 50 preferably performs user authentication when the first additional image and the second additional image are added in the above-described step S217.

<Effects of Embodiment>

According to a certain aspect, the latest contents of the document can be presented to a user based on the document that is a printed matter.

In the present system, each time a document is edited, an additional image showing a difference from the document before editing is registered on the server in association with the marker image showing the revised edition number. An additional image showing confidential information set for the document is also stored in association with the marker image. Accordingly, the additional image showing the editing contents is also added when the additional image showing the confidential information set for the document is added. In other words, the user utilizes terminal device 500 to display a document, so that the contents of the latest revised edition are also added together with the confidential information. Accordingly, even in the case where the user does not obtain a document of the latest revised edition, the user can readily know the contents of the latest revised edition based on the document that the user possesses, without having to perform a special operation for obtaining knowledge of the contents of the latest revised edition.

ANOTHER EXAMPLE1

In the above description, MFP 100 is assumed to compare the document data after editing with the document data before editing, and extract a difference therebetween. Furthermore, MFP 100 is also assumed to specify the type of editing based on the details of the difference. This is merely an example. The difference of the document data between before and after editing may be input by the user through PC 200 so that MFP 100 may be notified of the difference from PC 200. Furthermore, the type of editing may also be input by the user through PC 200 so that MFP 100 may be notified of the type of editing from PC 200. Alternatively, the CPU (not shown) of PC 200 may have a function of extraction unit 106 in FIG. 15 for extracting the difference of the document data between before and after editing. PC 200 notifies MFP 100 about the difference from the document data before editing and the position of this difference together with the document data after editing.

ANOTHER EXAMPLE2

Furthermore, a program for causing the CPU of the MFP to perform the above-described operation or a program for causing the CPU of the terminal device to perform the above-described operation can also be provided. Also, a program for causing the CPU of the MFP to perform the above-described operation is provided, so that a general-purpose MFP can be operated as the above-described MFP 100. Furthermore, a program for causing the CPU of the terminal device to perform the above-described operation is provided, so that a general-purpose terminal device can be operated as the above-described terminal device 500. Thereby, the present system can be readily constructed utilizing an existing MFP and terminal device.

The above-described program can be recorded on a non-transitory computer-readable recording medium such as a flexible disk, a CD-ROM (Compact Disk-Read Only Memory), a ROM (Read Only Memory), a RAM (Random Access Memory), and a memory card that are attached to the computer, and thus, provided as a program product. Alternatively, the program recorded on a non-transitory recording medium such as a hard disk incorporated in a computer can be provided. Furthermore, the program can also be provided by download via a network.

In addition, the program according to the present invention may cause the process to be executed by invoking a required module in a prescribed arrangement at a prescribed timing from program modules provided as part of the operating system (OS) of the computer. In this case, the program itself does not include the above-described modules but cooperates with the OS to execute the process. The program not including the above-described modules may also be included in the program according to the present invention.

Furthermore, the program according to the present invention may be provided while being incorporated in a part of another program. Also in such a case, the program itself does not include any modules included in the above-described another program, but cooperates with another program to execute the process. The program incorporated in another program as described above may also be included in the program according to the present invention.

The program product to be provided is installed in a program storage unit such as a hard disk for execution. It is to be noted that a program product includes a program itself and a non-transitory recording medium recording the program.

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. An image processing apparatus configured to manage documents, said image processing apparatus comprising:
   a memory configured to store an instruction; and
   a processor configured to execute said instruction,
   said processor being further configured to:
      generate a first additional image based on an image in a designated region of a first document,
      generate a second additional image showing a difference between said first document and a second document, said second document being a revision of the first document; and
      register said first additional image and said second additional image on another device in association with a marker image indicating a revision stage of said first document.

2. The image processing apparatus according to claim 1, wherein generating said second additional image includes extracting the difference between said first document and said second document.

3. The image processing apparatus according to claim 1, wherein said processor is further configured to synthesize an image showing said difference between said first document and said second document with said first additional image when an area of said difference between said first document and said second document is included in said designated region of said document.

4. The image processing apparatus according to claim 1, wherein said processor is further configured to print said marker image to replace said image in said designated region of said first document with the printed marker image.

5. The image processing apparatus according to claim 1, wherein said processor is further configured to set information for said second additional image for each user of a plurality of users, said information showing whether browsing is allowed or not when said second document is displayed for a user of the plurality of users.

6. A terminal device comprising:
   a photographing device;
   a memory configured to store an instruction; and
   a processor configured to execute said instruction,
   said processor being configured to:
      obtain, from another device, an additional image registered in association with a marker image in a photographed image taken by said photographing device, and
      cause a display device to display said photographed image and add said additional image to said photographed image,
   said additional image including a first additional image showing an image in a designated region in a first document, and a second additional image showing a difference between said first document and a second document, said second document being a revision of said first document; and
   said processor being further configured to add said first additional image at a position of said marker image in said document in said photographed image and add said second additional image at an area of the difference between said first document and said second document.

7. The terminal device according to claim 6, wherein
   said another device is configured to store an additional image in association with a marker image showing a revision stage for each revised edition of said first document, and
   said processor is configured to:
      determine a revision stage represented by said photographed image based on the marker image in said photographed image, and
      extract said second additional image from a plurality of additional images registered on said another device, said second additional image being associated with each of marker images associated with the revision stage represented by said photographed image to a latest revised edition of said first document.

8. A non-transitory recording medium recording a control program for controlling an operation of an image processing apparatus, said control program causing said image processing apparatus to:
   generate a first additional image based on an image in a designated region of a first document,
   generate a second additional image showing a difference between said first document and a second document; said second document being a revision of said first document; and
   register said first additional image and said second additional image on another device in association with a marker image indicating a revision stage of said first document.

9. The non-transitory recording medium according to claim 8, wherein generating said second additional image includes extracting the difference between said first document and said second document.

10. The non-transitory recording medium according to claim 8, wherein generating said first additional image includes synthesizing an image showing said difference between said first document and said second document with said first additional image when an area of said difference between said first document and said second document is included in said designated region in said document.

11. The non-transitory recording medium according to claim 8, wherein said control program further causes said image processing apparatus to print said marker image to replace said image in said designated region of said first document with the printed marker image.

12. The non-transitory recording medium according to claim 8, wherein said control program further causes said image processing apparatus to set information for said second additional image for each user of a plurality of users, said information showing whether browsing is allowed or not when said second document is displayed for a user of the plurality of users.

13. A non-transitory recording medium recording a control program for controlling an operation of a terminal device equipped with a photographing device and an addition device, said control program causing said terminal device to:

photograph a document using said photographing device, obtain, from another device, an additional image registered in association with a marker image in a photographed image taken by said photographing device, and display said photographed image and add said additional image to said photographed image, said another device storing a first additional image showing an image in a designated region in a first document and a second additional image showing a difference between said first document and a second document, said second document being a revision of said first document in association with a marker image indicating a revision stage for each revised edition of said document, said control program further causing said terminal device to:

determine a revision stage represented by said photographed image based on the marker image in said photographed image, obtain said first additional image registered in association with said marker image from said another device, and obtain said second additional image from said another device, said second additional image being associated with each of marker images associated with the revision stage represented by said photographed image to a latest revised edition of said first document, said displaying including adding said first additional image at a position of said marker image in said document in said photographed image, and adding said second additional image at an area of a difference from the first document.

14. The non-transitory recording medium according to claim 13, wherein said control program causes said terminal device to extract said second additional image from a plurality of additional images registered on said another device, said second additional image being associated with each of marker images associated with the revision stage represented by said photographed image to a latest revised edition of said first document.

* * * * *